United States Patent
Van Slyke et al.

(10) Patent No.: US 10,060,189 B2
(45) Date of Patent: Aug. 28, 2018

(54) HEXADECENE SYNTHETIC DRILLING FLUID WITH IMPROVED ENVIRONMENTAL PROPERTIES

(71) Applicant: Chevron U.S.A. Inc., San Ramon, CA (US)

(72) Inventors: Donald C. Van Slyke, Richmond, TX (US); Stephen Joseph Miller, San Francisco, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 205 days.

(21) Appl. No.: 14/854,698

(22) Filed: Sep. 15, 2015

(65) Prior Publication Data

US 2016/0083640 A1    Mar. 24, 2016

Related U.S. Application Data

(60) Provisional application No. 62/052,961, filed on Sep. 19, 2014.

(51) Int. Cl.
*C09K 8/32* (2006.01)
*E21B 7/00* (2006.01)

(52) U.S. Cl.
CPC .  *E21B 7/00* (2013.01); *C09K 8/32* (2013.01)

(58) Field of Classification Search
CPC . C09K 8/34; C09K 8/32; C09K 8/035; C09K 8/36; C09K 8/64; C09K 21/08; C09K 2208/34; C09K 2208/12; C09K 8/28; C09K 8/38; C09K 8/52; C09K 8/584; C09K 8/602; C09K 8/703; C09K 8/94; C09K 2208/18; C09K 2208/28; C09K 3/1018; C09K 8/032; C09K 8/04; C09K 8/06; C09K 8/18; C09K 8/44; C09K 8/502; C09K 8/512; C09K 8/514; C09K 8/605; C09K 8/685; C09K 8/887; C09K 8/90; E21B 43/26; E21B 21/14; E21B 43/121; E21B 43/166; E21B 21/00; E21B 7/00; E21B 7/15
See application file for complete search history.

(56) References Cited

U.S. PATENT DOCUMENTS

| | | | |
|---|---|---|---|
| 6,057,272 A * | 5/2000 | Gee | C09K 8/26 507/103 |
| 6,281,404 B1 | 8/2001 | Miller | |
| 2003/0036484 A1 * | 2/2003 | Kirsner | C09K 8/34 507/118 |

OTHER PUBLICATIONS

G. R. Lappin, L. H. Nemec, J. D. Sauer, J. D. Wagner, Kirk-Othmer Encyclopedia of Chemical Technology, Published Online: Sep. 17, 2010.*
D.C. Van Slyke, Non-toxic, inexpensive synthetic drilling fluid; *Journal of Cleaner Production*, vol. 5, No. 4, Apr. 1, 1997, pp. 318-318.

* cited by examiner

*Primary Examiner* — Kumar R Bhushan
(74) *Attorney, Agent, or Firm* — King & Spalding LLP

(57) ABSTRACT

The disclosure relates to drilling fluid compositions, and their method of use, comprising a C16 unbranched internal olefin, including blends of the C16 unbranched internal olefin and a C16 linear alpha olefin. The exemplary drilling fluids are characterized by properties, e.g., pour points and kinematic viscosities, that enable them to be particularly useful in deep water drilling operations and have reduced environmental impact, e.g., increased biodegradation and reduced sediment toxicity.

24 Claims, No Drawings

HEXADECENE SYNTHETIC DRILLING FLUID WITH IMPROVED ENVIRONMENTAL PROPERTIES

CROSS REFERENCE TO RELATED APPLICATIONS

The present non-provisional patent application claims priority under 35 U.S.C. 119(e) to U.S. Provisional Application No. 62/052,961 filed Sep. 19, 2014, and titled "Hexadecene Synthetic Drilling Fluid With Improved Environmental Properties," the entire contents of which is incorporated herein by reference.

FIELD OF THE INVENTION

This disclosure relates to hexadecene drilling fluid compositions and their methods for use in drilling and completing oil wells wherein the drilling fluid has improved properties such as high anaerobic biodegradation and low sediment toxicity.

BACKGROUND

The present disclosure relates to a drilling fluid particularly suitable for deep water (e.g., deep-sea) drilling operations having extreme temperature conditions at particularly difficult depths. In particular, water-based drilling fluids are usually not a viable option due to poor drilling performance, mainly caused by wellbore instability. Use of conventional non-aqueous drilling fluids such as diesel or synthetic-based fluid are problematic due to environmental concerns related to the disposal of contaminated drill cuttings, in particular toxicity and biodegradation of the oil-based drilling fluids.

On both offshore (deep water) and inland drilling barges and rigs, drill cuttings are conveyed up the drill hole by a drilling fluid. With non-aqueous drilling fluids, the cuttings are necessarily contaminated with an adherent film or layer of drilling fluid, which typically penetrates into the interior of the cuttings. This is true despite the use of various vibrating screens, mechanical separation devices and various chemical and washing techniques.

Currently, in outer continental shelf waters of the U.S., cuttings drilled using non-aqueous drilling fluids are prohibited from discharge unless they are in compliance with the EPA specified protocol for meeting technology-based standards associated with discharge of cuttings associated with synthetic based drilling fluids. Non-aqueous drilling fluids that do not meet these standards require an alternate method of disposal, most of which are far more expensive and more logistically difficult than local discharge of drilling cuttings. For example, if cuttings cannot be discharged offshore then they must be boxed and shipped to an onshore facility, which is very difficult and expensive in most regions.

The EPA requires that a drilling base fluid must exceed the performance of one of two identified synthetic fluid standards, a C1618 internal olefin (C1618 IO) and C8-C16 fatty acid/2-ethylhexyl esters, in the 275 day anaerobic biodegradation test (i.e. have higher biodegradation) and the 10 day sediment toxicity test using *Leptocheirus plumulosus* (i.e. have lower toxicity). At the present time, the only non-ester based SBF's that satisfy the requirements are C1618 IO and C1518 IO.

However, environmental and economic concerns have prompted the development of new drilling fluids. Blends of olefins and esters are being developed in response to the guidelines for a balance between technical requirements, cost, and environmental performance. However, supply issues have driven up the cost of C1618 internal olefin and esters are not particularly desirable because they are hydrolytically unstable and become unusable due to thickening under conditions found in deeper water operations. New synthetic-based drilling fluid blends are required to help ensure availability of EPA compliant drilling fluids, while satisfying technical requirements for fluids used in deep water operations.

SUMMARY OF THE INVENTION

The disclosure relates to drilling fluid compositions, and their method of use, comprising a C16 unbranched internal olefin (C16UIO) as well as blends of the C16 unbranched internal olefin (C16UIO) and a C16 linear alpha olefin (C16LAO). The exemplary drilling fluids are characterized by properties, e.g., pour points and kinematic viscosities, that enable them to be particularly useful in deep water drilling operations and have reduced environmental impact, e.g., increased biodegradation and reduced sediment toxicity.

DETAILED DESCRIPTION

Definitions and Terms

The phrase "drilling fluid" is used herein to refer to liquid fluids, fluid mixtures and mixtures of fluids and solids (as solid suspensions, mixtures and emulsions of liquids, gases and solids) used in operations to drill boreholes into the earth.

The phrase "base oil" or "base fluid" generally refers to hydrocarbon oil or oils that form the continuous phase of the drilling fluid into which other additives are mixed. For example, a base oil for drilling fluid comprises the unbranched hexadecene: C16 unbranched internal olefin and C16 linear alpha olefin in accordance with the example embodiments described herein.

The phrase "pour point" refers to the lowest temperature at which a fluid will pour or flow. (See, e.g., ASTM International Standard Test Method D97). The results are reported in degrees Celsius. Many commercial base oils have specifications for pour point. When base oils have low pour points, the base oils are also likely to have other good low temperature properties, such as low cloud point, and low cold flow viscosity.

The phrase "kinematic viscosity" refers to a measurement of the resistance to the flow of a fluid. Many base oils, drilling fluid compositions made from them, and the correct operation of equipment depends upon the appropriate viscosity of the fluid being used. Kinematic viscosity is determined by ASTM D445-06. The results are reported in $mm^2/s$ or centistoke. The term "centistoke," abbreviated "cSt," is a unit for kinematic viscosity of a fluid (e.g., a drilling fluid), wherein 1 centistoke equals 1 millimeter squared per second (1 cSt=1 $mm^2/s$). It is also the ratio of the dynamic viscosity of a fluid to the fluid density. See, e.g., ASTM Standard Guide and Test Methods D 2270-04, D 445-06, D 6074, and D 2983.

The term "biodegradation rate" as used herein for drilling fluids and drill cuttings is in connection with the method for performing the 275-day anaerobic biodegradation test and is defined in Federal Register, Part IV Environmental Protection Agency, 40 CFR Parts 9 and 35 entitled "Effluent Limitations Guidelines and New Source Performance Standards for the Oil and Gas Extraction Point Source Category", Fed. Reg. Vol. 66, No. 14, Jan. 22, 2001, Appendix 4 to Subpart A of Part 435, incorporated herein by reference. The 275-day anaerobic biodegradation test described in Appendix 4 to Subpart A of Part 435 is based on a modification of ISO Standard No. 11734:1995 (also incorporated herein by reference) for use in a marine environment.

The term "sediment toxicity" as used herein for drilling fluids and drill cuttings refers to EPA Method 1644: "Method for Conducting a Sediment Toxicity Test with *Leptocheirus plumulosus* and Non-Aqueous Drilling Fluids or Synthetic-Based Drilling Muds" and sediment preparation procedures specified in EPA Method 1646. EPA Method 1644 is published in "Analytic Methods for the Oil and Gas Extraction Point Source Category." The 10-day *Leptocheirus plumulosus* toxicity test characterizing the sediment toxicity according to BAT ("Best Available Technology Economically Achievable) effluent limitations and NSPS ("New Source Performance Standards") means the concentration (milligrams/kilogram dry sediment) of the base fluid in sediment that is lethal to 50 percent of the *Leptocheirus plumulosus* test organisms exposed to that concentration of the base fluids after ten days of constant exposure. The test is defined in ASTM Standard No. E1367-03 (2008) which is incorporated herein by reference.

The phrases "deep sea drilling" or "deep water drilling" are used interchangeably herein to refer to drilling operations that occur on the floor of a water body at depths greater than about 1,000 feet or more, e.g., on the ocean floor. In particular the temperature of the environment on or near the floor is typically less than 10° C. In certain embodiments, the minimum temperature that drilling fluid is exposed to in a deep water drilling operation is 10° C. or less, 5° C. or less, 0° C. or less. The term "sea level" is used herein according to its ordinary meaning and is generally used to refer to the mean sea level (MSL), an average level for the surface of one or more of Earth's oceans from which heights such as elevations may be measured to describe the mean. The term "ocean" or "sea" is generally used herein to describe any body of water that has depths of at least 1,000 ft below sea level and may be used to refer to large lakes, bays, and any other geographic feature. In particular, a body of water does not have to be still or contained; rivers, streams, canals, and other geographical features where water moves from one place to another are also included.

Unless otherwise indicated herein, scientific and technical terms used in connection with the present invention shall have the meanings that are commonly understood by those of ordinary skill in the art. Further, unless otherwise required by context, singular terms shall include pluralities and plural terms shall include the singular. More specifically, as used in this specification and the appended claims, the singular forms "a," "an" and "the" include plural references unless the context clearly dictates otherwise. Thus, for example, reference to "a drilling fluid additive" includes a plurality of drilling fluid additives, and the like. In addition, ranges provided in the specification and appended claims include both end points and all points between the end points. Therefore, a range of 2.0 to 3.0 includes 2.0, 3.0 and all points between 2.0 and 3.0, such as 2.1, 2.5 and 3.7. Furthermore, all numbers expressing quantities, percentages or proportions, and other numerical values used in the specification and claims, are to be understood as being modified in all instances by the term "about". As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Drilling Fluid Compositions

The C16 unbranched internal olefin (C16UIO) (also referred to as "unbranched isomerized olefin") of the present disclosure is a synthetic n-hexadecene, where n represents the position of the double bond (n=2, 3, 4, 5, 6, etc.) and where n is not 1 or 16. The double bond is distributed at all non-terminal positions within the chain. Each C16 unbranched internal olefin molecule contains 16 carbons, only one internal double bond and no branches. The location of the double bond results in a slightly bent structure for the molecule. An example of the structure of a C16 unbranched internal olefin is shown below. C16 unbranched internal olefins may be prepared according to the methods disclosed in U.S. Pat. No. 6,281,404 ("the U.S. '404 patent"). As disclosed in the U.S. '404 patent, the process for making C16 unbranched olefin is relatively inexpensive as it essentially consists of flowing 1-hexadecene over a catalyst (SAPO-39) in a hot tube (350-450° F.) at elevated pressure to keep the feed in the liquid phase to move the double bond inward and distribute it at all internal positions along the carbon chain. The 1-hexadecene feed material for the process of making C16 unbranched isomerized olefin can contain minor amounts of various impurities that can carry over into the C16UIO product. Such impurities include, but are not limited to, branched or unbranched carbon chains that may be saturated or internal or alpha olefins of various sizes, e.g., C12-C20. These impurities can be present in various amounts in C16UIO or C16LAO, e.g., in the range of less than 7%, less than 5%, less than 2%, or less than 1%. The amount is not particularly limited as long as the desired properties of the exemplary base fluid or drilling fluid described herein are not compromised. 1-hexadecene is less expensive than C1618 IO (it is one of the feeds to the process that makes C1618 IO). Hence, the cost of the blends described in this disclosure are expected to be lower than the cost of C1618 IO.

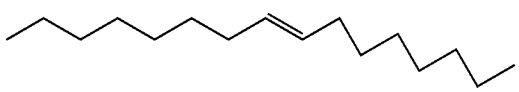

C$_{16}$ Unbranched Isomerized Olefin

In certain embodiments, the base fluid comprises C16UIO in an amount of at least about 12%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 97%, at least about 99%, or about 100% by volume of the base fluid. In alternative embodiments, the amount of C16UIO in the base fluid ranges between any two of the above described values. In alternative embodiments, a drilling fluid is provided that comprises a base fluid as described above.

The C16 linear alpha olefin (C16LAO) is a synthetic 1-hexadecene. The location of the double bond at the alpha (end) position results in a straight (linear) structure for the molecule. Each C16 linear alpha olefin molecule contains 16 carbons, only one end-position double bond and no branches. A structure of the C16 linear alpha olefin is shown below. There are several commercially-available C16 linear alpha olefin products, including Alpha Plus® 1-hexadecene made by Chevron Phillips Chemical Company and 1-hexadecene ("Alpha Olefin C16") supplied by Ineos Chemicals company. These products consist of between 95 and 99% 1-hexadecene with small amounts of various impurities including 1-tetradecene, 1-octadecene, paraffin, and isomers.

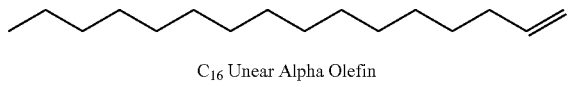 [SMILES: C=CCCCCCCCCCCCCCC]

C$_{16}$ Linear Alpha Olefin

In alternative embodiments, the base fluid comprises C16LAO in an amount of at least about 12%, at least about 25%, at least about 30%, at least about 35%, at least about 40%, at least about 45% or at least about 50% by volume of the base fluid. In alternative embodiments, the amount of C16LAO in the drilling fluid ranges between any two of the above described values.

In certain embodiments, the base fluid does not include any branched isomerized olefins. In alternative embodiments, the amount of branched isomerized olefins in an embodied base fluid is less than 30%, less than 20%, less than 15%, less than 10%, less than 7%, less than 5%, less than 2%, less than 1%, or less than 0.5% of the base fluid (i.e., the combined volume of C16UIO and C16LAO), for example, as determined by GC-MS. The degree of branching can be determined by Gas chromatography-mass spectrometry (GC-MS), an analytical method that combines the features of gas-liquid chromatography and mass spectrometry to identify different substances within a test sample.

In certain embodiments, the base fluid comprises C16UIO and C16LAO in a volume/volume ratio ranging from about 100/0 to about 25/75, from about 95/5 to about 30/70; from about 90/10 to about 35/65; from about 85/15 to about 40/60; from about 80/20 to about 45/55; from about 75/25 to about 50/50; from about 70/30 to about 55/45; from about 65/35 to about 60/40. In alternative embodiments, the volume/volume ratio of C16UIO and C16LAO ranges between any two of the ratios identified above. The ratios described with respect to the present embodiment are not with respect to the total volume of the base oil. In particular, the total volume of the base oil can include additional materials, as long as C16UIO and C16LAO are in the relative proportions set forth above. In alternative embodiments, although the relative amount of C16UIO and C16LAO in a drilling fluid or base fluid is defined by the disclosed ratios, the base fluid may include additional materials such as carbon chains that comprise from 12 to 20 carbons, i.e., C12-C20, that may be branched, cyclic, straight chained, saturated or unsaturated at any place along the carbon chain and mixtures of any of these, as long as the desired properties of the exemplary drilling fluid described herein are not compromised. In particular embodiments, the drilling fluid is hydrolytically stable and does not comprise ester-based oils.

In alternative embodiments, a drilling fluid is provided that comprises a base fluid as described herein further comprising one or more drilling additives.

In certain embodiments, the base fluid or drilling fluid satisfies the current environmental standards applicable to drilling fluids, as defined by the U.S. Environmental Protection Agency (EPA). In particular, the exemplary drilling fluids satisfy at least one of i) the 275-day anaerobic biodegradation test and ii) the 10-day *Leptocheirus plumulosus* toxicity tests in effect as of the date of this application.

In certain embodiments, the exemplary base fluid or drilling fluid is biodegradable to the extent that it satisfies the EPA standards for the 275-day anaerobic biodegradation. In certain embodiments, the exemplary drilling fluid is non-toxic to that extent that it satisfies the EPA standards for the 10-day *Leptocheirus plumulosus* toxicity. In certain embodiments, the exemplary drilling fluid satisfies both the EPA standards for 275-day anaerobic biodegradation and 10-day *Leptocheirus plumulosus* toxicity. In certain embodiments, both the C16UIO and C16LAO individually satisfy one or both of the EPA standards for 275-day anaerobic biodegradation and 10-day *Leptocheirus plumulosus* toxicity.

In certain embodiments, the exemplary base fluid or drilling fluid consistently passes the 10-day *Leptocheirus plumulosus* toxicity test with a toxicity ratio of <1 and consistently passes with a biodegradation ratio of <1 using the modified ISO 11734 test described in the guidelines and the permit.

In certain embodiments, the base fluid has a pour point useful as a component in a drilling fluid for deep water drilling. For example, the disclosed drilling fluid has a pour point of less than 5° C., less than 0° C., less than −1° C., less than −2° C., less than −3° C., less than −4° C., less than −5° C., less than −6° C., less than −7° C., less than −8° C., less than −9° C., less than −10° C., less than −12° C., less than −15° C., less than −17° C. or less than −18° C. In certain embodiments, the drilling fluid has a pour point in a range defined by any two of the above temperatures.

In certain embodiments, the drilling fluid has a pour point useful for deep water drilling. For example, the disclosed drilling fluid has a pour point of less than 5° C., less than 0° C., less than −1° C., less than −2° C., less than −3° C., less than −4° C., less than −5° C., less than −6° C., less than −7° C., less than −8° C., less than −9° C., less than −10° C., less than −12° C., less than −15° C., less than −17° C. or less than −18° C. In certain embodiments, the drilling fluid has a pour point in a range defined by any two of the above temperatures.

In certain embodiments, the base fluid has a kinematic viscosity useful as a component in a drilling fluid for deep water drilling. Lower kinematic viscosity results in lower equivalent circulating density during drilling, reduced lost circulation incidents and better hole cleaning efficiency. The rate of penetration during drilling is also higher with lower kinematic viscosity drilling fluids. Another advantage is reduced oil retention on cuttings coming over the shaker with low kinematic viscosity drilling fluids.

In particular, the exemplary base fluid has a kinematic viscosity at 40° C. of less than 3.0 mm$^2$/s, less than 2.9 mm$^2$/s, less than 2.8 mm$^2$/s, less than 2.7 mm$^2$/s, less than 2.6 mm$^2$/s, or less than 2.5 mm$^2$/s, less than 2.4 mm$^2$/s, less than 2.3 mm$^2$/s. In certain embodiments, the base fluid has a kinematic viscosity at 40° C. in a range defined by any two of the above kinematic viscosities. In certain embodiments, the base fluid has a kinematic viscosity at 40° C. of about any of the kinematic viscosity values identified above, i.e., of about 3.0 mm$^2$/s, of about 2.9 mm$^2$/s, of about 2.8 mm$^2$/s, of about 2.7 mm$^2$/s, of about 2.6 mm$^2$/s, of about 2.5 mm$^2$/s, of about 2.4 mm$^2$/s or of about 2.3 mm$^2$/s.

In particular, the exemplary drilling fluid has a kinematic viscosity at 40° C. of less than 3.0 mm$^2$/s, less than 2.9 mm$^2$/s, less than 2.8 mm$^2$/s, less than 2.7 mm$^2$/s, less than 2.6 mm$^2$/s, or less than 2.5 mm$^2$/s, less than 2.4 mm$^2$/s, less than 2.3 mm$^2$/s. In certain embodiments, the drilling fluid has a kinematic viscosity at 40° C. in a range defined by any two of the above kinematic viscosities. In certain embodiments, the drilling fluid has a kinematic viscosity at 40° C. of about any of the kinematic viscosity values identified above, i.e., of about 3.0 mm$^2$/s, of about 2.9 mm$^2$/s, of about 2.8 mm$^2$/s, of about 2.7 mm$^2$/s, of about 2.6 mm$^2$/s, of about 2.5 mm$^2$/s, of about 2.4 mm$^2$/s or of about 2.3 mm$^2$/s.

There is also an advantage of using certain embodiments of the disclosed drilling fluids in drilling exploration wells. Regardless of the ratio used, in certain embodiments, the gas chromatography fingerprint will be very narrow, encompassing essentially only C16 hydrocarbons. This minimizes interference of the base oil fingerprint compared to the formation oil fingerprint (in-situ hydrocarbons), making geochemical interpretation more accurate.

The disclosed drilling fluid has at least one of the following advantages: passes the EPA's 10 day sediment toxicity test using *Leptocheirus plumulosus*; compliance with EPA's 275 day anaerobic biodegradation test; compliance with current EPA regulations in at least one of US, GOM, Brazil, Vietnam; provision of supply chain protection during periods of severe shortage of C1618 IO; lower kinematic viscosity for better drilling performance than C1618 IO; excellent pour point for use in deep water drilling operations, significantly improved hydrolytic stability compared to ester-based drilling fluids or drilling fluids comprising esters; narrow gas chromatography fingerprint for better geochemical interpretation on exploration wells; and significant cost reduction compared to EPA compliant C1618 IO.

Drilling Fluid Additives

Example embodiments described herein are directed to a drilling fluid comprising a base fluid comprising the foregoing blends of C16UIO and C16LAO and further comprising drilling additives that are well known in the art. The drilling fluid additives are not particularly limited as long as they do not interfere with the desired properties of the embodied drilling fluids. The drilling additives include one or more of the following drilling fluid additives: a solvent suitable for such applications well known in the art, such as water or brine, surfactants (e.g., emulsifiers, wetting agents), viscosifiers, weighting agents, fluid loss control agents, and shale inhibiting salts. Because the drilling fluids according to the disclosed embodiments are intended to be non-toxic, these optional ingredients are preferably also non-toxic. Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidazolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary weighting agents include, but are not limited to barite, iron oxide, gelana, siderite, and calcium carbonate. Typically, the concentration of the weighting agent is 100-700 lbs/bbl.

Common shale inhibiting salts are alkali metal and alkaline-earth metal salts. Calcium chloride and sodium chloride are the preferred shale inhibiting salts.

Common alkalinity and pH-control additives are used to optimize pH and alkalinity in water-base drilling fluids. The control of drilling fluid system properties may dependent on pH (e.g., the detection and treatment of contaminants such as cement and soluble carbonates). pH may also affect the solubility of thinners and divalent metal ions such as calcium and magnesium, and influences the dispersion or flocculation of clays. Among the most common materials used to control pH are the alkali and alkaline earth oxides and hydroxides: NaOH, KOH, Ca(OH)$_2$, Mg(OH)$_2$ (hydrated or slaked lime), Ca(O) (quick lime) and Mg(O).

Exemplary viscosifiers include, but are not limited to, organophilic clays (e.g., hectorite, bentonite, and attapulgite), non-organophilic clays (e.g., montmorillonite (bentonite), hectorite, saponite, attapulgite, and illite), oil soluble polymers, polyamide resins, and polycarboxylic acids and soaps. The typical concentration of viscosifiers, e.g., organophilic clay, is 0 to 15 lbs/bbl.

Examples of fluid loss control agents include, but are not limited to, asphaltics (e.g., asphaltenes and sulfonated asphaltenes), amine treated lignite, and gilsonite. The typical concentration of fluid loss control agents is 2 to 20 lbs/bbl. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention. The typical concentration of polymeric fluid loss control agents is 0.05 to 15 lbs/bbl.

Optionally, one or more pour point depressants are employed in the drilling fluids according to the example embodiments disclosed herein to lower their pour point. Typical pour point depressants include, but are not limited to, ethylene copolymers, isobutylane polymers, polyalkyl-naphthalenes, wax-aromatic condensation products (e.g., wax-naphthalene condensation products, phenol-wax condensation products), polyalkylphenolesters, polyalkylmethacrylates, polymethacrylates, polyalkylated condensed aromatics, alkylaromatic polymers, iminodiimides, and polyalkylstyrene. (The molecular weights for polyaklyl-naphthalenes, polyalkylphenolesters, and polyalkylmethacrylates range from about 2,000 to about 10,000). Because they are non-toxic, ethylene copolymers and isobutylene polymers are the preferred pour point depressants. Up to about 1 weight percent pour point depressant is typically employed. (As used in the specification and claims, the weight percent of the pour point depressant is based upon the weight of the monoester, i.e., it is the weight of the pour point depressant divided by the weight of the monoester, the quotient being multiplied by 100%.) Preferably, the pour point depressant is employed in a concentration of 0.005 to about 0.5, more preferably about 0.01 to about 0.4, and most preferably about 0.02 to about 0.3, weight percent. When employed, the pour point depressant is preferably mixed with the monoester and the resulting composition is then combined with any additional additives as described herein.

While not intending to limit the types or amounts of additives that may be appropriate for various drilling operations utilizing the base fluids disclosed herein, a drilling fluid comprising a base fluid according to the present disclosure may further comprise one or more additives selected from the group below:

a) between about 0.5 wt % to about 5.0 wt % of an emulsifier and a wetting agent;

b) between about 0.1 wt % to about 5.0 wt % of an organophilic clay;

c) between about 2.0 wt % to about 30 wt % of water;

d) between about 1.0 wt % to about 10 wt % of a salt;
e) between about 0.1 wt % to about 5.0 wt % of a filtration control agent; and
f) between about 5.0 wt % to about 70 wt % of a weighting agent.

An exemplary drilling fluid composition is shown in Table Ia with suitable concentration ranges for invert emulsion drilling fluids made with the hexadecene base fluid blends of C16LAO and C16UIO according to the presently disclosed embodiments. Specifically, the term "hexadecene" as used in Tables 1a and 1b is intended to encompass both C16LAO and C16UIO. The ranges disclosed in Table 1a cover drilling fluids with mud weights from 8.6 to 20 ppg and oil-water ratios from 50/50 to 98/2. Table 1b discloses a particular drilling fluid that includes specific amounts within the ranges identified for the additives listed in Table 1a. The below exemplified formulations are optimized for deep water drilling performance. However, a person of ordinary skill in the art can readily envisage other ranges and other additives that would be appropriate for practicing the disclosed embodiments of drilling and drilling fluids.

TABLE 1a

Additive Ranges for Invert Emulsion Drilling Fluids
8.6 to 20 lbs/gal Densities. 50/50 to 98/2 Oil-Water Ratios

| Additive | Weight % | Volume % |
|---|---|---|
| Hexadecene | 11.6-66 | 34.4-38.6 |
| Water | 1-39.6 | 1.7-41.8 |
| CaCl$_2$ | .5-20.2 | 4-9.7 |
| Organoclay | .2-1.7 | .3-.9 |
| Fluid Loss Control Additive | .6-1.4 | .7-.8 |
| Lime | .3-1.6 | .1-.5 |
| Emulsifier | .55-2.7 | .63-3.2 |
| Wetting Agent | 0-1.4 | 0-2.1 |
| Barite | 2.7-79.8 | 0.7-45.4 |

TABLE 1b

Typical Additive Concentrations for Invert Emulsion Drilling Fluid
12 lbs/gal Density, 80/20 oil-Water Ratio

| Additive | Weight % | Volume % |
|---|---|---|
| Hexadecene | 32.5 | 60.3 |
| Water | 10.5 | 15.1 |
| CaCl$_2$ | 5.4 | 3.5 |
| Organoclay | 1.2 | 9 |
| Fluid Loss Control Additive | 1 | .7 |
| Lime | .4 | .17 |
| Emulsifier | 1.3 | 2 |
| Wetting Agent | .6 | 8 |
| Barite | 39.2 | 16.5 |

Methods of Using the Example Drilling Fluids

Example embodiments described herein are directed to methods of drilling a wellbore through a formation which are not particularly limited and are well known to those of skill in the art. In an exemplary embodiment the method comprises the steps of: operating a drilling assembly to drill a wellbore and circulating a drilling fluid through the wellbore to bring drill cuttings to the top of the wellbore, wherein the drilling fluid comprises a base fluid comprising C16 unbranched internal olefin (C16UIO) or a blend of a C16 unbranched internal olefin (C16UIO) and a C16 linear alpha olefin (C16LAO).

In certain embodiments, the wellbore is at a depth of at least 1,000 ft below sea level. In other embodiments, the drilling fluid is exposed to a minimum temperature of 10° C. or less, 5° C. or less, 0° C. or less, −2° C. or less, or −5° C. or less during at least a portion of the drilling operation. In other embodiments, the method of drilling is utilized in a deep water drilling operation where the wellbore is at a depth of at least 1,000 ft below sea level and the drilling fluid is exposed to a minimum temperature of 10° C. or less during at least a portion of the drilling operation.

Additional embodiments are directed to methods of use of the drilling fluid comprising C16 unbranched internal olefin or a blend of a C16 unbranched internal olefin and a C16 linear alpha olefin embodied herein for shallow water offshore drilling, onshore drilling, pay zone drilling, and drill-in fluid drilling as other examples. The exemplified drilling fluids are particularly useful for plugging back, sand control, perforating, gravel packing, chemical treatment, hydraulic fracturing subterranean formations, packer fluid placement, well killing fluid, spotting fluid, and lubricant in water-based drilling fluid.

EXAMPLES

The following examples are provided to demonstrate particular embodiments of the drilling fluids disclosed herein. It would be appreciated by those of skill in the art that the examples which follow merely represent exemplary embodiments of the drilling fluids disclosed herein. However, those of skill in the art should, in light of the present disclosure, appreciate that many changes can be made in the specific embodiments described and still obtain a like or similar result without departing from the spirit and scope of the drilling fluids disclosed herein.

The properties of the components that make up disclosed drilling fluids are compared with the properties of the EPA standard C1618 IO in Table 2 below.

TABLE 2

| | Reference C1618 Isomerized Olefin | A: C18 Linear Alpha Olefin (1-hexadecene) | B: C16 Unbranched isomerized Olefin | 50/50 Blend of A and B |
|---|---|---|---|---|
| Type | EPA-compliant reference fluid; mixture of branched and unbranched | EPA-Compliant Linear Alpha Olefin | | |
| Sediment Toxicity L. plumulosus 10 day LC50 Compliance Ratio (Ref Fluid/Test Fluid) | 1 | 0.35 | | 0.8 |
| 275 Day Anaerobic Biodegradation % Compliance Ratio (Ref Fluid/Test Fluid) | 1 | | 0.8 | |

TABLE 2-continued

|  | Reference C1618 Isomerized Olefin | A: C18 Linear Alpha Olefin (1-hexadecene) | B: C16 Unbranched isomerized Olefin | 50/50 Blend of A and B |
| --- | --- | --- | --- | --- |
| Total Aromatics, wt % | ND* | ND* | 0.02% |  |
| Kinematic Viscosity at 40° C., cSt | 3.0-3.7 | 2.4 | 2.69 |  |
| Cold Flow Viscosity at 0° C., cp |  |  | 5.37 |  |
| Flash Point, ° C. | 135 | 125 | 132 |  |
| Pour Point, ° C. | +12 | 4 | +24 | −7.8 |
| Density, g/cc | 0.79 | 0.785 | 0.795 |  |
| Aniline Point, ° C. | 78 |  |  |  |

ND* Not Detectable

As discussed above, if a synthetic drilling fluid exceeds the performance of the C1618 IO standard in the 10 day sediment toxicity test and the 275 day anaerobic biodegradation test, then it can be discharged offshore according to EPA regulations. 1-hexadecene (i.e., C16LAO) consistently passes the EPA requirements in both the 10-day sediment toxicity test and the 275 day anaerobic biodegradation test. The reason that it has not been used in deep water drilling operations is that the pour point is too high at +4 C, discussed in more detail below.

As can be seen from Table 2, the pour point of a 50/50 blend of C16 unbranched internal olefin (C16UIO) and 1-hexadecene (C16LAO) was depressed by a surprising 11.8° C. compared to the pour point of pure 1-hexadecene. As would be understood by a person experienced with drilling fluid blends, the pour point resulting from a combination of fluids is not simply an average of the pour point of the constituent materials and can be unpredictable. In particular, the slightly bent structure of C16UIO would not be expected to depress the pour point of the linear molecule of C16LAO by such a significant amount. Particularly advantageous is the fact that the pour point depression of 11.8° C. reduces the pour point from +4° C. to −7.8° C., which enables this fluid to be used during deep water drilling operations where the sea floor temperature is just above 0° C. As mentioned above, 1-hexadecene cannot be used by itself because the drilling fluid would solidify when exposed to floor temperature conditions during deep water drilling operations. However, by adding 50% C16 unbranched isomerized olefin, the pour point is reduced to −7.8° C. and the drilling fluid is thin and flows readily at sea floor temperature conditions.

The pour points of various blends of C16 unbranched isomerized olefin (C16UIO) and 1-hexadecene (C16LAO) are shown in Table 3. The cold flow viscosities (measured at 0° C.) are sufficiently low (thin) for C16 unbranched isomerized olefin to 1-hexadecene ratios of 100/0, 75/25, and 50/50 and are particularly useful for deep water drilling applications.

TABLE 3

| Ratio C16 Unbranched Isomerized Olefin to 1-hexadecene | Pour Point, deg C. | Depression in Pour Point Compared to 1-hexadecene, deg C. |
| --- | --- | --- |
| 100/0 | <−18 | >22 |
| 75/25 | −12.2 | 16.2 |
| 50/50 | −7.8 | 11.8 |
| 25/75 | −2.8 | 6.8 |
| 0/100 | 4 | 0 |

The invention claimed is:

1. A base fluid comprising a blend of:
   a) at least 12% by volume of the base fluid comprising a C16 unbranched internal olefin; and
   b) at least 30% by volume of the base fluid comprising a C16 linear alpha olefin;
   wherein the base fluid has a pour point of 0° C. or lower, and wherein an amount of branched isomerized olefins in the base fluid is less than 10% of a combined volume of the C16 unbranched internal olefin and the C16 linear alpha olefin.

2. The base fluid according to claim 1, comprising at least 25% by volume of the C16 unbranched internal olefin.

3. The base fluid according to claim 1, wherein the C16 unbranched internal olefin and the C16 linear alpha olefin are present in a volume/volume ratio ranging from about 70/30 to about 25/75.

4. The base fluid according to claim 1, wherein the C16 unbranched internal olefin and the C16 linear alpha olefin are present in a volume/volume ratio ranging from about 65/35 to about 50/50.

5. The base fluid according to claim 1, wherein the amount of branched isomerized olefins in the base fluid is less than 5% of the base fluid.

6. The base fluid according to claim 1, wherein the amount of branched isomerized olefins in the base fluid is less than 2% of the base fluid.

7. The base fluid according to claim 1, wherein the amount of branched isomerized olefins in the base fluid is less than 1% of the base fluid.

8. The base fluid according to claim 1, having a pour point of −2° C. or lower.

9. The base fluid according to claim 1, having a pour point of −5° C. or lower.

10. The base fluid according to claim 1, having a kinematic viscosity at a temperature of 40° C. of less than about 2.90 cSt.

11. The base fluid according to claim 1, having a kinematic viscosity at a temperature of 40° C. of less than about 2.70 cSt.

12. The base fluid according to claim 1, comprising at least 25% by volume of the C16 unbranched internal olefin, having a pour point of −3° C. or less and a kinematic viscosity at a temperature of 40° C. of 2.90 cSt or less.

13. A drilling fluid comprising a base fluid and one or more of a drilling fluid additive, wherein the base fluid comprises a blend of:
   a) at least 12% by volume of the base fluid comprising a C16 unbranched internal olefin; and
   b) at least 30% by volume of the base fluid comprising a C16 linear alpha olefin;
   and wherein the base fluid has a pour point of 0° C. or lower, and wherein an amount of branched isomerized olefins in the base fluid is less than 10% of a combined volume of the C16 unbranched internal olefin and the C16 linear alpha olefin.

14. The drilling fluid comprising the base fluid according to claim 13, wherein the drilling fluid has a pour point of 0° C. or lower.

15. The drilling fluid comprising the base fluid according to claim 13, wherein the drilling fluid has a pour point of −5° C. or lower.

16. The drilling fluid comprising the base fluid according to claim 13, wherein the drilling fluid has a kinematic viscosity at a temperature of 40° C. of less than about 2.90 cSt.

17. The drilling fluid comprising the base fluid according to claim 13, wherein the drilling fluid has a kinematic viscosity at a temperature of 40° C. of less than about 2.70 cSt.

18. The drilling fluid comprising the base fluid according to claim 13, wherein the drilling fluid does not include an ester-based drilling fluid.

19. The drilling fluid according to claim 13, wherein the drilling fluid passes the 275-day anaerobic biodegradation test.

20. The drilling fluid according to claim 13, wherein the drilling fluid passes the 10-day *Leptocheirus plumulosus* sediment toxicity test.

21. The drilling fluid according to claim 13, wherein the one or more additives is selected from the group consisting of:

a) between about 0.5 wt % to about 5.0 wt % of an emulsifier and a wetting agent;
b) between about 0.1 wt % to about 5.0 wt % of an organophilic clay;
c) between about 2.0 wt % to about 30 wt % of water;
d) between about 1.0 wt % to about 10 wt % of a salt;
e) between about 0.1 wt % to about 5.0 wt % of a filtration control agent; and
f) between about 5.0 wt % to about 70 wt % of a weighting agent.

22. A method for drilling a wellbore through a formation, the method comprising: operating a drilling assembly to drill the wellbore and circulating a drilling fluid through the wellbore as it is drilled, the drilling fluid comprising a base fluid according to claim 1.

23. The method for drilling a wellbore through a formation, the method comprising: operating a drilling assembly to drill a wellbore and circulating a drilling fluid of claim 13 through the wellbore as it is drilled.

24. The method for drilling a wellbore according to claim 23, wherein the wellbore is located at a depth of at least 1,000 feet below sea level.

\* \* \* \* \*